United States Patent [19]

Ogawa

[11] Patent Number: 4,643,554
[45] Date of Patent: Feb. 17, 1987

[54] CAMERA WITH FOCAL LENGTH VARYING DEVICE

[75] Inventor: Yukio Ogawa, Kanagawa, Japan

[73] Assignee: Canon Kabushiki Kaisha

[21] Appl. No.: 794,314

[22] Filed: Nov. 1, 1985

Related U.S. Application Data

[63] Continuation of Ser. No. 561,640, Dec. 15, 1983, abandoned.

[30] Foreign Application Priority Data

Dec. 20, 1982 [JP] Japan .......................... 57-191163[U]
Dec. 24, 1982 [JP] Japan .......................... 57-202261[U]

[51] Int. Cl.⁴ .............................................. G03B 3/00
[52] U.S. Cl. ................................. 354/400; 354/195.12
[58] Field of Search ............... 354/400, 402, 403, 404, 354/405, 406, 407, 408, 195.12, 195.1; 352/140

[56] References Cited

U.S. PATENT DOCUMENTS

| | | | |
|---|---|---|---|
| 3,618,499 | 11/1971 | Harvey | 354/403 |
| 4,183,639 | 1/1980 | Suwa | 354/402 |
| 4,238,153 | 12/1980 | Imura | 354/400 |
| 4,300,823 | 11/1981 | Yamamaka et al. | 352/140 |
| 4,367,935 | 1/1983 | Kuge et al. | 354/400 |
| 4,505,566 | 3/1985 | Noguchi | 354/400 |
| 4,536,068 | 8/1985 | Kodaira | 354/195.12 |
| 4,572,643 | 2/1986 | Akashi | 354/195.1 |

Primary Examiner—Russell E. Adams
Attorney, Agent, or Firm—Toren, McGeady and Goldberg

[57] ABSTRACT

In a camera which has an automatic focusing device and is arranged to permit a change-over from one focal length of the photo taking optical system thereof to another, the focusing position of the automatic focusing device is arranged to vary in response to the focal length change-over of the photo taking optical system, so that the focusing operation can be always carried out appositely to the selected focal length of the optical system.

37 Claims, 6 Drawing Figures

CAMERA WITH FOCAL LENGTH VARYING DEVICE

This is a continuation of application Ser. No. 561,640 filed Dec. 15, 1983.

BACKGROUND OF THE INVENTION

1. Field of the Invention

This invention relates to a camera which permits a change-over of focal length of the photo taking optical system thereof.

2. Description of the Prior Art

During recent years, there have been proposed cameras of the kind having a focal length varying device which permits photographing at various focal lengths such as a normal focal length, a telephoto focal length, etc. In a camera of this kind, however, the F-number of the aperture and the depth of field of a photo taking optical system will vary as a result of a focal length change-over. Therefore, the arrangement of the prior art to automatically focus the photo taking optical system by means of the automatic focusing device has presented various problems. For example, it has been known, from U.S. Pat. No. 4,183,643, etc., to set a photo taking optical system in a certain predetermined position where the widest in-focus range is obtainable when a distance to an object to be photographed is undetectable by means of a distance measuring circuit in an automatic focusing type camera. This predetermined position is generally a hyper-focal point in which the optical system is focused on a hyper-focal distance with the farthest point within the depth of field becoming an infinity distance (hereinafter the predetermined position will be called a fix point). However, the distance from the photo taking optical system to the hyper-focal point is in direct proportion to the square of the focal length of the photo taking optical system and in inverse proportion to the square of the aperture F-number thereof. In the case of a variable focal length type camera having a photo taking optical system which is shiftable, for example, for a normal optical system of focal length 40 mm (F 2.8) to a telephoto optical system of focal length 70 mm (F 5.6), the hyper-focal point varies to a great extent according to the focal length change-over. Therefore, in case such a variable focal length camera is provided with an automatic focusing device, the probability of an out-of-focus photographing operation increases under a condition where distance cannot be measured if the above-stated fix point is left unvarying despite a focal length change-over.

Further, in the case of an automatic focusing type camera provided with a flash device, problems such as under exposure, etc. tend to arise, even when a focusing operation is appositely carried out, because the flash light quantity of the flash device is limited. To be more specific, between a guide number GN which denotes the flash light quantity to be emitted from the flash device, an F-number of the aperture of the photo taking optical system and a distance "d" between the flash device and an object to be photographed, there is the following relation: $GN = F \times d$. With the aperture F-number unvarying, a light quantity larger than the guide number of the flash device theoretically becomes necessary when the object is located at a long distance. To solve this problem, there have been proposed, as known from Japanese Utility Model Application Laid-Open No. Sho 54-18229, etc., an arrangement wherein the shift of a photo taking optical system toward an infinity position is limited to a distance within a flash photographable distance range determined jointly by the F-number of the aperture and the guide number of the flash device (hereinafter this distance will be called flash device far point) even when the object is located at a long distance. Thus, the camera is restricted to photographing within a range which can be sufficiently covered with the flash light quantity of the flash device.

However, if a camera of this kind is provided with the focal length varying device mentioned in the foregoing, the above-stated far point of the flash device will vary accordingly as the aperture F-number varies, because the F-number varies every time the focal length of the photo taking optical system is shifted. Thus, a camera of this kind also presents a problem.

SUMMARY OF THE INVENTION

A first object of the present invention is to provide an automatic focusing type camera which permits a change-over from one focal length of the photo taking optical system thereof to another and in which the automatic focusing device of the camera is arranged to vary the focusing position thereof according to the focal length change-over of the photo taking optical system, so that focal point adjustment can be performed appositely to a selected focal length of the photo taking optical system.

A second object of the invention is to provide a camera of the above-stated kind wherein there are provided a plurality of fix points at which the photo taking optical system can be stopped from shifting when an object distance is unmeasurable. The fix points are arranged to permit selection of one of them according to the focal length changeover of the photo taking optical system, so that focusing accuracy under a condition where distance is not measurable can be increased.

A third object of the invention is to provide a camera of the above-stated kind wherein, in the event of flash photography, the photo taking optical system is brought to a stop in a position corresponding to the above-stated far point of the flash device for an object located at a distance farther than the far point of the flash device in response to a focal length change-over operation on the photo taking lens so that the focusing operation of the automatic focusing device can be carried out always appositely for flash photography.

These and further objects and features of the invention will become apparent from the following detailed description of preferred embodiments thereof taken in connection with the accompanying drawings.

BRIEF DESCRIPTION OF THE DRAWINGS

FIG. 1(a) is a plan view showing the camera as in a normal photographing state. FIG. 1(b) is a plan view showing the camera in a telephoto state.

DETAILED DESCRIPTION OF THE PREFERRED EMBODIMENTS

Figure 1A:
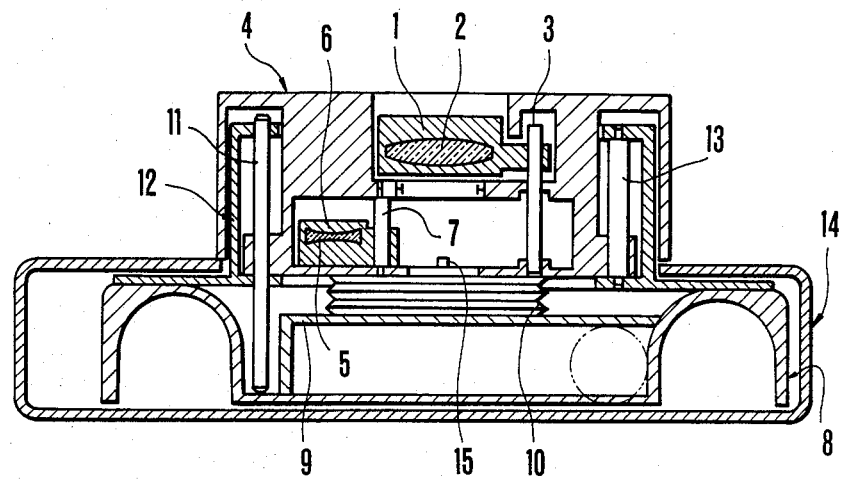
FIGS. 1(a) and 1(b) are sectional views showing a camera provided with a focal length varying device according to the present invention as first and second embodiments thereof.
Figure 1B:
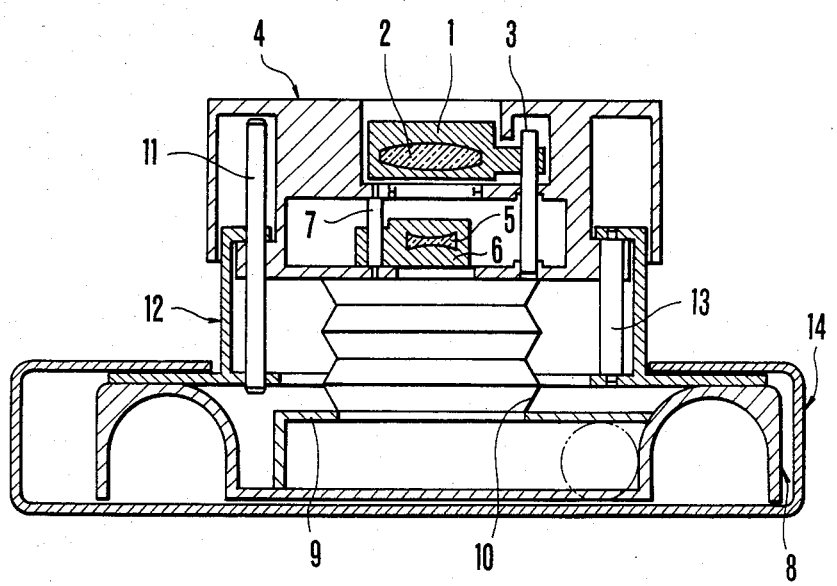

Preferred embodiments of the present invention will be described below with reference to the accompanying drawings, in which FIGS. 1a and 1b are sectional views roughly showing the essential parts of a variable focal length type camera arranged according to the invention as first and second embodiments thereof. FIG. 1(a) shows the camera in a normal photographing state and FIG. 1(b) shows it in a telephoto state. Referring to these drawings, a main lens system 2 is carried by a lens barrel 1. A lens barrel bar 3 is secured to the lens barrel 1 and is arranged in parallel with a photo taking optical axis. The lens barrel bar 3 is fittingly carried by a lens barrel unit 4 at two points thereof. Behind the lens barrel 1 is disposed a shutter (not shown) within the lens barrel unit 4. An extender 6 which carries an auxiliary lens system 5 is rotatably disposed on a shaft 7 within a space further behind the lens barrel 1. The shaft 7 is fittingly carried by the lens barrel unit 4. The extender 6 is urged toward the rear of the camera by a spring (not shown) wound around between the lens barrel unit 4 and the shaft 7. This causes the extender 6 to abut on an adjustment screw (not shown) which is in screwed engagement with the rear face of the lens barrel unit 4. When the lens barrel unit 4 is drawn out from the state of FIG. 1(a) to the state of FIG. 1(b), the extender 6 turns on the shaft 7 to bring the auxiliary lens system onto the optical axis of the main lens system 2.

A bellows 10 is disposed between the rear face of the lens barrel unit 4 and a light shielding frame plate 9 which forms a dark box part of a camera body 8 with the end faces of the bellows secured to them respectively.

A support bar 11 is secured to the lens barrel unit 4 and is disposed in parallel with the photo taking optical axis. Meanwhile, a holding plate 12 is fittingly engaged with the lens barrel unit 4 and is attached to the front face of the camera body 8. The support bar 11 is fittingly carried by the holding plate 12 and is arranged to be slidable at the front and rear side plate parts of the holding plate 12. The holding plate 12 also has two ends of a guide bar 13 secured to the front and rear plate parts thereof. The guide bar 13 which is thus arranged in parallel with the photo taking optical axis fittingly engages the other side of the lens barrel unit 4. The lens barrel unit 4 is thus arranged to be slidable back and forth relative to the camera body together with the support bar 11 with the guide bar 13 serving as guide for the sliding movement of the lens barrel unit 4. The camera is provided with an outside casing 14 and a pin 15 for positioning the extender 6.

Figure 2:
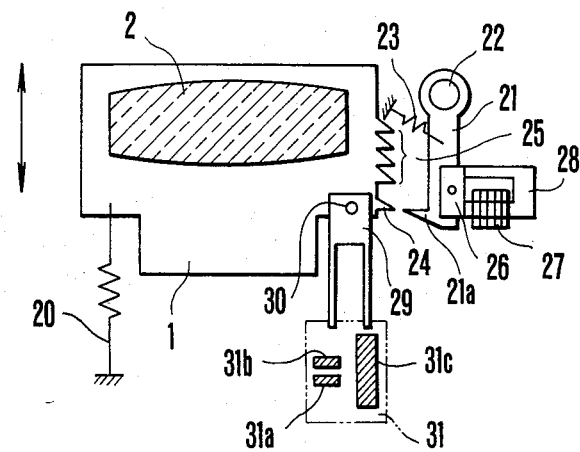
FIG. 2 is a schematic plan view partially in section showing a mechanism for adjusting the shifting extent of a main lens of the first embodiment.

Next, FIG. 2 shows the shifting extent adjusting mechanism for the lens barrel 1 of the first embodiment shown in FIG. 1. Referring to FIG. 2, a spring 20 is arranged to urge the lens barrel 1 to move downward as viewed on the drawing. A stop lever 21 is arranged to lock the lens barrel 1 against the force of the spring 20. The stop lever 21 is provided with a claw part 21a which is arranged to engage a claw 24 for locking the lens barrel 1 in its initial position and also to engage ratchet teeth 25 for locking the lens barrel 1 in other positions according to information on a distance to an object to be photographed. Further, the stop lever 21 is pivotally carried by a support shaft 22 and is urged clockwise by a spring 23. Under a condition after completion of a film winding operation of the camera, the urging force of the spring 23 causes the claw 21a to engage the claw 24. This brings the movement of the lens barrel 1 due to the spring 20 to a stop. This movement of the lens barrel 1 is arranged to shift the focal point of the main lens system 2 from the nearest distance position to the infinity distance position thereof. The extent to which the lens barrel 1 is shifted is arranged to be detected by a shifting extent detector (not shown).

An armature 26 is secured to the stop lever 21. When power supply is effected to a coil 27, the armature 26 is attracted by a yoke 28. With the armature 26 attracted by the yoke 28, the stop lever 21 is kept in the position of FIG. 2. A brush 29 for electrical conduction is secured by a pin 30 to the lens barrel 1. The brush 29 is thus arranged to slide over a patterned circuit substrate 31. On the substrate 31 are provided a copper foil piece 31c which is arranged to come into contact with one of the legs of the brush 29 and copper foil pieces 31a and 31b which are arranged to come into contact with the other leg of the brush 29.

Further, the copper foil piece 31a is arranged to come into contact with the brush 29 when the lens barrel 1 comes to a position in which the optical system is focused on a hyper-focal distance in the case of photographing with both the main lens system 2 and the auxiliary lens system 5 as shown in FIG. 1(b). The copper foil piece 31b is arranged to come into contact with the brush 29 when the lens barrel 1 comes to a position in which the optical system is focused on a hyper-focal distance in carrying out photographing solely with the main lens system 2 as shown in FIG. 1(a). Further, the brush 29 is arranged to electrically connect the copper foil piece 31c to the copper foil pieces 31a and 31b.

Figure 3:
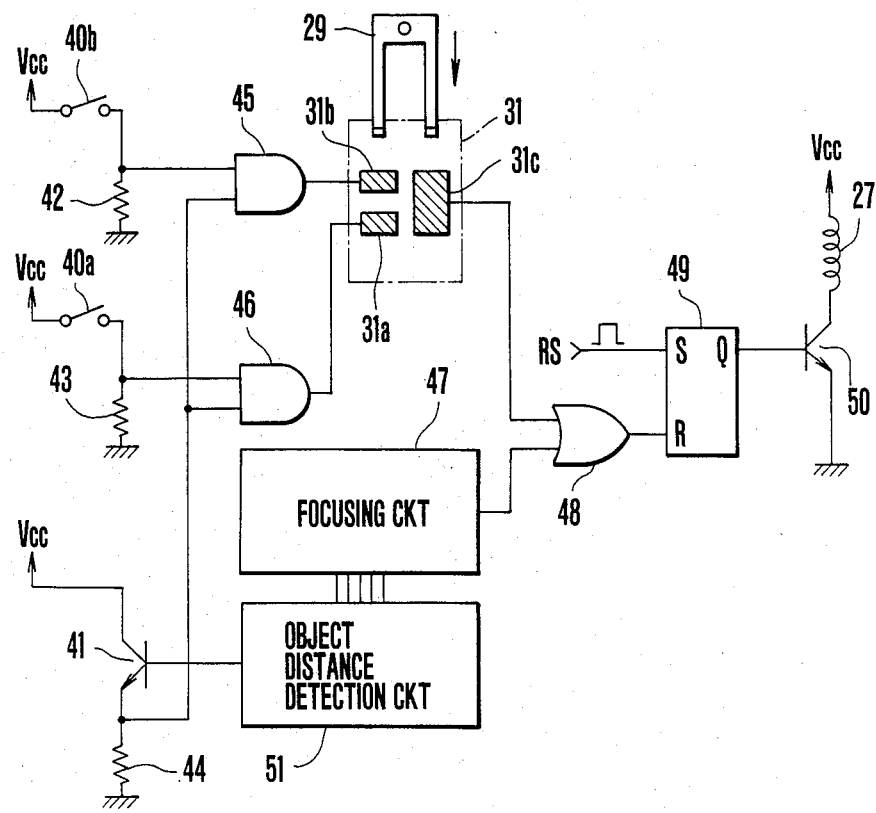
FIG. 3 is a circuit diagram showing a control circuit included in the first embodiment shown in FIG. 2

FIG. 3 shows the control circuit of the first embodiment. Switches 40a and 40b are arranged to turn on and off in response to the focal length change-over of the optical system. The switch 40a turns on when the camera is set into the telephoto state as shown in FIG. 1(b) while the other switch 40b turns on when the camera is set into the normal photographing state as shown in FIG. 1(a). One of the terminals of each of the switches is connected to a constant voltage source Vcc which begins to effect power supply in response to the first stroke of a depressing operation on a shutter button (not shown). The other terminal of each of the switches is grounded via a resistor 42 or 43. A switching transistor 41 is arranged to be turned on or off by the output of an object distance detecting circuit 51. The transistor 41 has its collector connected to the power source Vcc and its emitter grounded via a resistor 44. Reference numberals 45 and 46 denote two-input AND gates. One of the input terminals of the AND gate 45 is connected to the resistor 42 and the other input terminal thereof to the resistor 44. One of the input terminals of the AND gate 46 is connected to the resistor 43 and the other thereof to the resistor 44. The output of the AND gate 45 is connected to the above-stated copper foil piece 31b while that of the AND gate 46 is connected to the copper foil piece 31a. A focusing circuit 47 is arranged to produce a high level pulse signal when the lens barrel 1 is moved to a position corresponding to the ouput of the object distance detecting circuit 51. An OR gate 48 is arranged to receive a signal from the copper foil piece 31c and the pulse signal from the focusing circuit 47. The output terminal of the OR gate 48 is connected to the reset terminal of an RS flip-flop 49 (hereinafter will be called RS-FF). The RS-FF 49 is arranged to be reset by a pulse signal RS produced by the second stroke of the depressing operation of the shutter button (not shown). The output Q of the RS-FF 49 is arranged to perform on and off control over a switching transistor 50 which is arranged to control power supply to a coil 27. The object distance detecting circuit 51 is arranged to produce a distance signal to the focusing circuit 47 when a distance to an object to be photographed is detected and to produce a high level signal to the base of the transistor 41 when the object distance is undetectable. This circuit arrangement is well known from the above-cited U.S. Pat. No. 4,183,643, etc. and therefore requires no detailed description.

The following description of the operation of this embodiment which is arranged as described above begins with description of the operation thereof performed when the object distance is detectable by the object distance detecting circuit 51.

Under that condition, a distance signal is produced from the object distance detecting circuit 51 to the focusing circuit 47. A low level signal is supplied from the circuit 51 to the base of the transistor 41. This low level signal turns the transistor 41 off. Accordingly, the input terminals of the AND gates 45 and 46 connected to the resistor 44 are kept at a low level. The AND gates 45 and 46 thus produce low level outputs. When the pulse signal RS is produced by the depressing operation on the shutter button, the RS-FF 49 is set. The level of the output Q of the RS-FF 49 becomes high. This turns the transistor 50 on to begin power supply to the coil 27. As a result, the armature 26 is attracted by the yoke 28. The stop lever 21 disengages its claw part 21a from the claw 24. This allows the lens barrel 1 to be moved by the spring 20 from the nearest distance position to the infinity distance position.

In this instance, if the object is located at an infinity distance, the lens barrel 1 causes the brush 29 to electrically connect either the copper foil piece 31a or 31b to the copper foil piece 31c on its way to the infinity distance position. However, since both the AND gates 45 and 46 are then producing low level outputs, the output of the OR gate 48 remains at a low level even when the brush 29 comes into contact with the copper foil piece 31b or 31a. Therefore, the RS-FF 49 is not reset. The lens barrel 1 is therefore allowed to move on. As a result, the lens barrel 1 comes to an in-focus position and is stopped there by the stop lever 21 when the power supply to the coil 27 comes to a stop with the RS-FF 49 reset by the output of the focusing circuit 47.

In case that the camera is in the normal photographing state as shown in FIG. 1(a) and that the object distance is undetectable by the object distance detecting circuit 51, in that instance the camera operates so that the switch 40b and the transistor 41 turn on. Therefore, the AND gate 45 receives two high level inputs and thus produces a high level signal. This causes the lens barrel 1 to move. Then, when the brush 29 comes into contact with the copper foil pieces 31b and 31c, the output level of the OR gate 48 becomes high to reset the RS-FF 49. The coil 27 then ceases to receive power supply. The claw 21a of the stop lever 21 comes to engage the ratchet claw 25 to bring the movement of the lens barrel 1 to a stop.

In this case, therefore, the lens barrel 1 comes to a stop in a position where it is in focus for a hyper-focal distance under the normal photographing condition.

When the camera is set into the telephoto state of FIG. 1(b), the auxiliary lens 5 enters the photo taking optical system. As a result, the hyper-focal distance of the whole photo taking lens extends toward the infinity distance. Meanwhile, as mentioned in the foregoing, the copper foil piece 31a is then located in a position corresponding to this hyper-focal distance. Since the switch 40 turns on in this instance, if the transistor 41 turns on due to the inability of the object distance detecting circuit 51 to measure the distance, the output level of the AND gate 46 which is connected to the copper foil piece 31a becomes high. Therefore, when the brush 29 electrically connects the copper foil pieces 31a and 31c, the RS-FF 49 is reset to bring the movement of the lens barrel 1 to a stop. The lens barrel 1 thus comes to a stop at a position where it is in focus for the hyper-focal distance of the photo taking optical system with the optical system in its telephoto state.

Figure 4:
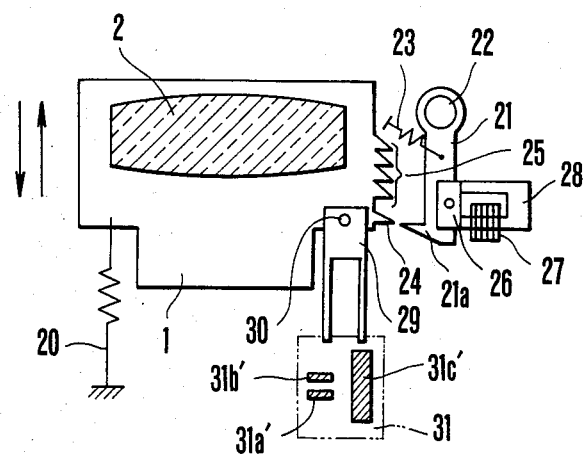
FIG. 4 is a schematic plan view partially in section showing a mechanism for adjusting the shifting extent of a main lens of the second embodiment.
Figure 5:
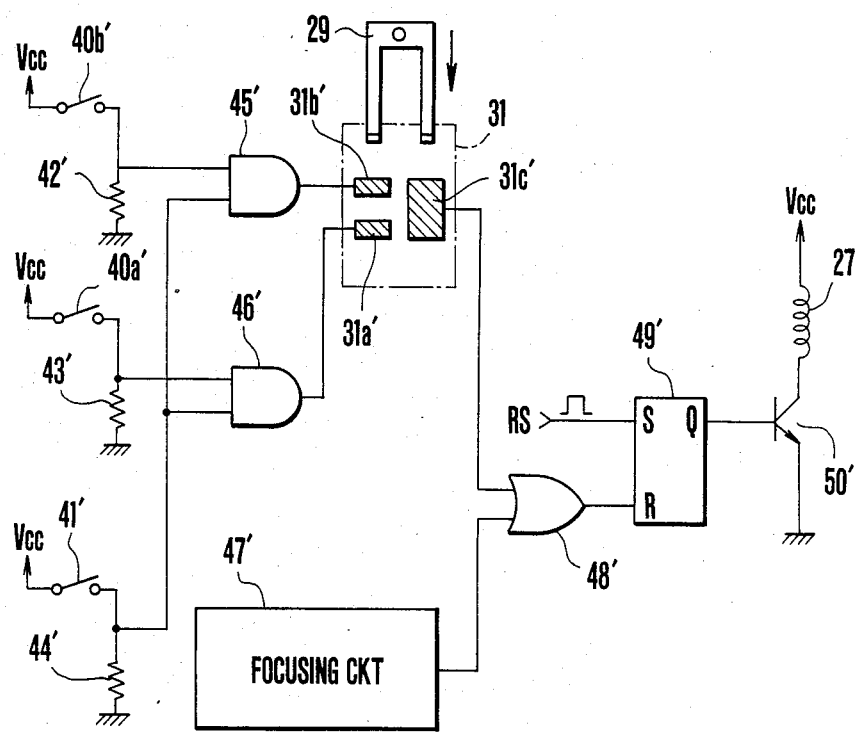
FIG. 5 is a circuit diagram showing a control circuit included in the second embodiment shown in FIG. 4.

A second embodiment of the invention is arranged as shown in FIGS. 1, 4 and 5. The arrangement as shown in FIG. 1 is identical with the first embodiment and thus requires no further description thereof. Meanwhile, the arrangement shown in FIGS. 4 and 5 corresponds to the arrangement of the first embodiment shown in FIGS. 2 and 3. The parts that are the same as those shown in FIGS. 2 and 3 are, therefore, indicated by the same reference numerals in FIGS. 4 and 5 and these same parts are omitted from the following description.

FIG. 4 shows a mechanism for adjusting the shifting extent of the lens barrel 1. Referring to FIG. 4, a copper foil piece 31a' is disposed in a position to come into contact with the brush 29 when the lens barrel 1 moves to a position where the optical system is in focus on a flash device far-point distance determined by the F-number of the aperture and the guide number of the flash device which is incorporated in the camera (not shown) in the case of photographing solely with the main lens 2. Another copper foil piece 31b' is disposed in a position to come into contact with the brush 29 when the lens barrel 1 moves to a position where the optical system is in focus on a flash device far-point distance which is determined by the F-number of the aperture and the guide number of the flash device in the case of photographing with both the main lens 2 and the auxiliary lens 5. Meanwhile, the brush 29 is arranged to electrically connect a copper foil piece 31c' to the copper foil pieces 31a' and 31b'. The rest of the arrangement is identical with the arrangement shown in FIG. 2.

FIG. 5 shows the control circuit arrangement of the second embodiment, which includes switches 40a' and 40b' which are arranged to turn on and off in response to the focal length change-over of the optical system. The switch 40b' turns on when the camera is set into the telephoto state as shown in FIG. 1(b), while the other switch 40a' turns on when the camera is set into the normal photographing state as shown in FIG. 1(a). One of the terminals of each of these switches 40a' and 40b' is connected to a constant voltage source Vcc which is arranged to begin power supply in response to the first stroke of a depressing operation on the shutter button (not shown). The other terminal of each of these switches is grounded via a resistor 42' or 43'. Another switch 41' is arranged to turn on in response to a charging process initiating operation on a flash device (not shown). Alternatively, the switch 41' may be arranged to turn on in response to a pop-up motion of the flash device. One of the terminals of the switch 41' is connected to the power source Vcc while the other terminal of this switch is grounded via a resistor 44'.

Reference numerals 45' and 46' denote two-input AND gates. One of the input terminals of the AND gate 45' is connected to the resistor 42', while the other is connected to the resistor 44'. The AND gate 46' has one of its input terminals connected to the resistor 43' and the other to the resistor 44'. The output terminal of the AND gate 45' is connected to the copper foil piece 31b', while that of the AND gate 46' is connected to the copper foil piece 31a'. A focusing circuit 47' is arranged to produce a high level pulse signal when the lens barrel 1 comes to a position corresponding to the output of a focal point detecting circuit (not shown). An OR gate 48' is arranged to receive a signal from the copper foil piece 31c' and the pulse signal produced from the focusing circuit 47'. The output terminal of the OR gate 48' is connected to the reset terminal of an RS flip-flop 49' (hereinafter called RS-FF). The RS-FF 49' is arranged to be set by a pulse signal RS produced in response to he second stroke of the depressing operation on the shutter button (not shown). The output Q of the RS-FF 49' is arranged to turn on and off a switching transistor 50' which controls power supply to the coil 27. With the embodiment arranged in this manner, an ordinary photographing operation without using the flash device will first be described. The switch 41' is off in this instance. The input terminals of the AND gates 45' and 46' which are connected to the resistor 44' are kept at a low level. Accordingly, the output levels of these AND gates 45' and 46' are low. Under this condition, when the pulse signal RS is produced by the depressing operation on the shutter button, the RS-FF 49' is set to make the level of the output Q thereof high. The transistor 50' then turns on to allow the power supply to the coil 27 to begin. As a result, the armature 26 is attracted by the yoke 28 to disengage the claw part 21a of the stop lever 21 from the claw 24. The force of the spring 20 the begins to move the lens barrel 1 from the nearest distance position toward the infinity distance position thereof.

If the object to be photographed is located at an infinity distance in this instance, the lens barrel 1 on its way toward the infinity distance position causes the brush 29 to electrically connect the copper foil piece 31b' or 31a' to the copper foil piece 31c'. Since the output levels of both the AND gates 45' and 46' are low at that time, the output level of the OR gate 48' never becomes high when the brush 29 comes into contact with the copper foil piece 31b' or 31a' and thus does not reset the RS-FF 49'. This permits the lens barrel 1 to move on farther until it is brought to a stop by the stop lever 21 when the power supply to the coil 27 is cut off with the RS-FF 49' reset.

In case that flash photography is to be carried out with the camera set in the normal photographing state as shown in FIG. 1(a), in the operation of the embodiment the switches 40a' and 41' turn on in this case. Therefore, the levels of both the inputs of the AND gate 46' become high. This causes the AND gate 46' to produce a high level signal. Therefore, the lens barrel 1 moves to bring the brush 29 into contact with the copper foil pieces 31a' and 31c'. Then, the output level of the OR gate 48' becomes high to reset the RS-FF 49'. The power supply to the coil 27 comes to a stop. The claw 21a of the stop lever 21 comes to engage the ratchet claw 25 to bring the movement of the lens barrel 1 to a stop. In this instance, therefore, the movement of the lens barrel 1 comes to a stop at a position where the optical system is justly focused on the far point of the flash device for normal photographing even when the object to be photographed is located at a far distance. Further, in the event that the object is located at a near distance and the output level of the focusing circuit 47' becomes high before the copper foil pieces 31a' and 31c' are electrically connected to each other, the high level signal thus produced from the circuit 47' resets the RS-FF 49'. The lens barrel 1, therefore, then comes to stop shifting of the optical system at a position where it is accurately focused on the object.

When the camera is set into the telephoto state as shown in FIG. 1(b), the position of the auxiliary lens 5 is shifted to the inside of the optical system. As a result of that, the aperture F-number of the optical system becomes larger. This causes the far point of the flash device to shift toward the nearest distance position. As mentioned in the foregoing, the copper foil piece 31b' is arranged in a position that corresponds to the far point of the flash device in that instance. Further, in that instance, the switches 40b' and 41' are turned on. Accordingly, the output level of the AND gate 45' which is connected to the copper foil piece 31b' becomes high. The embodiment is thus arranged such that with the object located at a far distance, when the copper foil pieces 31b' and 31c' are electrically connected to each other by the brush 29, the RS-FF 49' is reset to bring the lens barrel 1 to a stop. Further, in the same manner as has been described in the foregoing, when the object is located at a near distance and a high level pulse signal is produced from the focusing circuit 47' before the brush 29 comes to electrically connect the copper foil pieces 31b' and 31c', the lens barrel 1 is stopped from moving at that instant.

In this specific embodiment, the switches which are arranged to be turned on by the movement of the lens barrel 1 are disposed in the positions corresponding to the far points of the flash device; and the power supply to the magnet is arranged to be cut off to stop the lens barrel 1 from further moving with these switches turned on in the event of flash photography. This arrangement, however, may be replaced with some other suitable arrangement. For example, a pin may be arranged to protrude within the moving region of the lens barrel 1 at the time of flash photography to engage the lens barrel 1 in such a way as to prevent it from moving farther from the far point of the flash device; and this pin may be arranged to be shiftable in response to the focal length change-over of the optical system.

In accordance with the invention, as described in the foregoing, an automatic focusing type camera capable of shifting the photo taking optical system for one focal length to another is arranged to have the optical system justly focused on a hyper-focal distance thereof when the distance to an object to be photographed is undetectable; and, in the event of flash photography, the maximum shifting extent toward the infinity distance of the photo taking optical system is limited according to the far point of the flash device which is determined by the focal length of the photo taking optical system. The camera according to the invention thus always ensures appropriate focusing in accordance with changes which take place in the aperture F-number, the depth of field as a result of the focal length change-over of the photo taking optical system. The invention thus gives a highly advantageous effect on the camera.

While specific embodiments of the invention have been shown and described in detail to illustrate the application of the inventive principles, it will be understood that the invention may be embodied otherwise without departing from such principles.

What I claim:

1. A camera capable of shifting a photo taking optical system thereof from one focal length to another, comprising:
    (a) automatic focusing means for automatically adjusting the focal point of said photo taking optical system;
    (b) stopping means for stopping said photo taking optical system at a predetermined focusing position irrespective of a distance to an object to be photographed when the object distance is undetectable by said automatic focusing means; and
    (c) switching means for varying, in response to the focal length change-over of said photo taking optical system, the position at which said optical system is to be stopped by said stopping means.

2. A camera according to claim 1, wherein said photo taking optical system is arranged to begin to move in a predetermined direction in response to a shutter release operation.

3. A camera according to claim 2, wherein said stopping means includes predetermined focusing position detecting means for detecting the state of said photo taking optical system when said optical system reaches said predetermined focusing position after commencement of movement of said optical system.

4. A camera according to claim 3, wherein said switching means includes a switching member for varying, in response to the focal length change-over of said photo taking optical system, the detecting position to be detected by said predetermined focusing position detecting means.

5. A camera according to claim 4, wherein said stopping means includes priority determining means arranged to render said stopping means inoperative when the object distance is detectable by said automatic focusing means.

6. A camera having a flash device and being capable of shifting a photo taking optical system thereof from one focal length to another, comprising:
    (a) automatic focusing means for automatically adjusting the focal point of said photo taking optical system;
    (b) stopping means for stopping said photo taking optical system at a predetermined focusing position corresponding to a far point of said flash device in preference over the focal point adjusting position of said automatic focusing means when the object distance is farther than the far point of said flash device in the event of flash photography; and
    (c) switching means for varying, in response to the focal length change-over of said photo taking optical system, the position at which said optical system is to be stopped by said stopping means.

7. A camera according to claim 6, wherein said photo taking optical system is arranged to begin to move in a predetermined direction in response to a shutter release operation.

8. A camera according to claim 7, wherein said stopping means includes predetermined focusing position detecting means for detecting the state of said photo taking optical system when said optical system reaches said predetermined focusing position after commencement of movement of said optical system.

9. A camera according to claim 8, wherein said switching means includes a switching member for varying, in response to the focal length change-over of said photo taking optical system, the detecting position to be detected by said predetermined focusing position detecting means.

10. A control device for a photographic optical system changeable in focal length, comprising:
    (A) automatic focusing means for automatically adjusting the focal point of said photographic optical system;
    (B) predetermined focal point setting means for setting said photographic optical system at a predetermined focal point when said automatic focusing means fails to detect the distance to an object; and
    (C) switching means for varying the predetermined focal point to be set by the predetermined focal point setting means in response to the focal length changeover of the photographic optical system.

11. A control device according to claim 10, wherein said photographic optical system is arranged to begin to move in a predetermined direction in response to a shutter release operation.

12. A control device according to claim 11, further comprising stopping means for stopping said photographic optical system at a predetermined focusing position irrespective of the distance to an object to be photographed when the object distance is undetectable by said automatic focusing means, said stopping means including predetermined focusing position detecting means for detecting the state of said photographic optical system when said optical system reaches said predetermined focusing position at the commencement of movement of said optical system.

13. A control device according to claim 12, wherein said switching means includes a switching member for varying, in response to the focal length changeover offset photographic optical system, the detecting position to be detected by said predetermined focusing position detecting means.

14. A control device according to claim 13, wherein said stopping means includes priority determining means arranged to render said stopping means inoperative when the object distance is detected by said automatic focusing means.

15. A control device for a photographic optical system changeable in focal length with a flash device, comprising:
    (A) automatic focusing means for automatically adjusting the focal point of said photographic optical system;
    (B) predetermined focal point setting means for setting said photographic optical system to a predetermined focal point when the distance to an object to be photographed is farther than the furthest effective distance of the flash device; and
    (C) switching means for varying the predetermined focal point to be set by the predetermined focal point setting means in response to the focal length changeover of the photographic optical system.

16. A control device according to claim 15, wherein said photographic optical system is arranged to begin to move in a predetermined direction in response to a shutter release operation.

17. A control device according to claim 16, further comprising stopping means for stopping said photographic optical system at a predetermined focusing position irrespective of the distance to an object to be photographed when the object distance is undetectable by said automatic focusing means, said stopping means including predetermined focusing position detecting means for detecting the state of said photographic optical system when said optical system reaches said predetermined focusing position at the commencement of movement of said optical system.

18. A control device according to claim 17, wherein said switching means includes a switching member for varying, in response to the focal length changeover offset photographic optical system, the detecting position to be detected by said predetermined focusing position detecting means.

19. A control device according to claim 18, further comprising stopping means for stopping said photographic optical system at a predetermined focusing position irrespective of the distance to an object to be photographed when the object distance is undetectable by said automatic focusing means, said stopping means including predetermined focusing position detecting means for detecting the state of said photographic optical system when said optical system reaches said predetermined focusing position at the commencement of movement of said optical system.

20. An operation control device for a photographic optical system, comprising:
  (A) automatic focusing means for automatically adjusting the focal point of said photographic optical system;
  (B) predetermined focal point setting means for setting said photographic optical system at a predetermined focal point when said automatic focusing means fails to detect the distance to an object; and
  (C) switching means for varying the predetermined focal point to be set by the predetermined focal point, setting means in response to the focal length variation of the photographic optical system.

21. A control device according to claim 20, wherein said photographic optical system is arranged to begin to move in a predetermined direction in response to a shutter release operation.

22. A control device according to claim 21, further comprising stopping means for stopping said photographic optical system at a predetermined focusing position irrespective to the distance to an object to be photographed when the object distance is undetectable by said automatic focusing means, said stopping means including predetermined focusing position detecting means for detecting the state of said photographic optical system when said optical system reaches said predetermined focusing position at the commencement of movement of said optical system.

23. A control device according to claim 22, wherein said switching means includes a switching member for varying, in response to the focal length changeover offset photographic optical system, the detecting position to be detected by said predetermined focusing position detecting means.

24. A control device according to claim 23, wherein said stopping means includes priority determining means arranged to render said stopping means inoperative when the object distance is detected by said automatic focusing means.

25. An operation control device for a photographic optical system, comprising:
  (A) hyperfocal condition setting means for setting said photographic optical system in a hyperfocal condition; and
  (B) means for changing the set state of said photographic optical system by said hyperfocal condition setting means in response to change in the focal length of said photographic optical system.

26. A control device according to claim 25, wherein said photographic optical system is arranged to begin to move in a predetermined direction in response to a shutter release operation.

27. A control device according to claim 26, further comprising stopping means for stopping said photographic optical system at a predetermined focusing position irrespective of the distance to an object to be photographed when the object distance is undetectable by said automatic focusing means, said stopping means including predetermined focusing position detecting means for detecting the state of said photographic optical system when said optical system reaches said predetermined focusing position at the commencement of movement of said optical system.

28. A control device according to claim 27, wherein said switching means includes a switching member for varying, in response to the focal length changeover offset photographic optical system, the detecting position to be detected by said predetermined focusing position detecting means.

29. An operation control device for a photographic optical system, comprising:
  (A) automatic focusing means for automatically adjusting the focal point of said photographic optical system;
  (B) predetermined focal point setting means for setting said photographic optical system to a predetermined focal point when the distance to an object to be photographed is farther than the furthest effective distance of the flash device; and
  (C) switching means for varying the predetermined focal point to be set by the predetermined focal point setting means in response to change of the F-number at the fully open aperture resulting from change in the focal length of said photographic optical system.

30. A control device according to claim 33, wherein said photographic optical system is arranged to begin to move in a predetermined direction in response to a shutter release operation.

31. A control device according to claim 30, wherein said switching means includes a switching member for varying, in response to the focal length changeover offset photographic optical system, the detecting position to be detected by said predetermined focusing position detecting means.

32. A control device according to claim 31, further comprising stopping means for stopping said photographic optical system at a predetermined focusing position irrespective of the distance to an object to be photographed when the object distance is undetectable by said automatic focusing means, said stopping means including predetermined focusing position detecting means for detecting the state of said photographic optical system when said optical system reaches said predetermined focusing position at the commencement of movement of said optical system.

33. An operation control device for photographic optical system, comprising:

(A) setting means responsive to changing over to a flash exposure mode for setting said photographic optical system to a prescribed focal condition; and (B) switching means for changing said prescribed focal condition to be set by said setting means in response to change of the F-number at the fully open aperture resulting from change in the focal length of said photographic optical system.

34. A control device according to claim 33 wherein said photographic optical system is arranged to begin to move in a predetermined direction in response to a shutter release operation.

35. A control device according to claim 34, wherein said switching means includes a switching member for varying, in response to the focal length changeover offset photographic optical system, the detecting position to be detected by said predetermined focusing position detecting means.

36. An operation control device for a photographic optical system variable in focal length, comprising:

(A) automatic focusing means for automatically adjusting the focal point of said photographic optical system;

(B) predetermined focal point setting means for setting said photographic optical system to a predetermined focal point when said automatic focusing means fails to properly adjust the focal point of said photographic optical system; and (C) switching means for changing the predetermined focal point so as to correspond to the focal length of the photographic optical system in response to changes in focal length of the photographic optical system.

37. An operation control device for a photographic optical system variable in focal length, comprising:

(A) automatic focusing means for automatically adjusting the focal point of said photographic optical system;

(B) predetermined focal point setting means for setting said photographic optical system to a predetermined focal point when said automatic focusing means fails to adjust the focal point of the photographic optical system in an appropriate flashing range of said flash device, and (C) switching means for changing the predetermined focal point so as to correspond to the focal length of the photographic optical system in response to changes in focal length of the photographic optical system.

* * * * *